United States Patent [19]

Miller et al.

[11] Patent Number: 5,932,184
[45] Date of Patent: Aug. 3, 1999

[54] METHOD FOR RECOVERY OF TUNGSTEN FROM SPENT CATALYSTS

[75] Inventors: Michael J. Miller; Clarence D. Vanderpool, both of Towanda, Pa.

[73] Assignee: GTE Products Corporation, Danvers, Mass.

[21] Appl. No.: 08/271,569

[22] Filed: May 26, 1992

Related U.S. Application Data

[63] Continuation of application No. 07/587,142, Sep. 24, 1990, abandoned.

[51] Int. Cl.$^6$ .................................................... C01G 41/00
[52] U.S. Cl. ........................... 423/61; 423/593; 423/606; 423/53
[58] Field of Search ................. 423/606, 61, 53, 423/593; 252/25, 515, 516; 502/24, 25

[56] References Cited

U.S. PATENT DOCUMENTS

| | | | |
|---|---|---|---|
| 2,339,888 | 1/1944 | Smith | 423/58 |
| 3,911,077 | 10/1975 | Martin et al. | 423/58 |
| 4,092,400 | 5/1978 | Zbranek et al. | 423/54 |
| 4,167,555 | 9/1979 | Gomes et al. | 423/53 |
| 4,353,878 | 10/1982 | Quatrini et al. | 423/61 |
| 4,353,879 | 10/1982 | Quatrini et al. | 423/53 |
| 4,353,880 | 10/1982 | Quatrini | 423/53 |
| 4,454,098 | 6/1984 | Scheithauer et al. | 423/55 |
| 4,490,339 | 12/1984 | Beckstead et a. | 423/58 |
| 4,508,701 | 4/1985 | Goddard et al. | 423/61 |
| 4,666,685 | 5/1987 | Wiewiorowski | 502/25 |
| 4,670,229 | 6/1987 | Wiewiorowski et al. | 423/53 |
| 4,861,565 | 8/1989 | Sefton et al. | 423/53 |

FOREIGN PATENT DOCUMENTS

| | | | |
|---|---|---|---|
| 52-68890 | 6/1977 | Japan | 502/25 |
| 53-108091 | 9/1978 | Japan | 423/53 |
| WO8203849 | 11/1982 | WIPO . | |

*Primary Examiner*—Ngoc-Yen Nguyen
*Attorney, Agent, or Firm*—Robert F. Clark

[57] ABSTRACT

A method for recovering tungsten from a tungsten containing spent catalyst comprises digesting the catalyst in aqueous sodium hydroxide solution wherein the mole ratio of the sodium hydroxide to the tungsten contained in the spent catalyst is from about 2.6 to about 4.2 and wherein the amount of water is sufficient to dissolve the subsequently produced sodium tungstate, at a temperature of at least about 90° C. for a length of time of at least about 1 hour to convert greater than about 77% by weight of the tungsten contained in the spent catalyst to sodium tungstate and form a sodium tungstate solution thereof and a residue containing the balance of the starting tungsten, and separating the sodium tungstate solution from the residue. Essentially all of the tungsten is recovered as sodium tungstate by first grinding the catalyst prior to the digestion and by using a mole ratio of sodium hydroxide to tungsten of about 3.8 to 4.2.

4 Claims, No Drawings

METHOD FOR RECOVERY OF TUNGSTEN FROM SPENT CATALYSTS

This is a continuation of application Ser. No. 07/587,142, filed on Sep. 24, 1990, now abandoned.

BACKGROUND OF THE INVENTION

This invention relates to methods for recovering tungsten from tungsten containing spent catalysts which involve digesting the catalyst in sodium hydroxide using a relatively low ratio of sodium hydroxide to tungsten. At least about 77% by weight of the tungsten can be recovered as sodium tungstate under these conditions. The remainder of the tungsten can be recovered by first grinding the catalyst and increasing the sodium hydroxide to tungsten mole ratio.

Desulfurization catalysts using valuable metals such as tungsten, molybdenum, cobalt, and nickel, as components are used in the petroleum refining industry. Generally the catalysts are made of a carrier such as aluminum oxide, spinel ($MgO.Al_2O_3$), or aluminum silicate.

Due to economic and environmental factors, it is feasible to recover the valuable metals from these spent catalysts for reuse.

One method of recovery involves the use of a soda ash digestion followed by considerable processing to a calcium tungstate end product. This method requires the use of acid to drive off the carbonate and calcium to precipitate the tungsten. The final form of the tungsten product is also of limited usefulness.

U.S. Pat. No. 4,384,885 relates to another method in which an oxidative roasting followed by carbon/CaO reduction is utilized. The tungsten is found in the metal slag of this process.

Bureau of Mines (Document No. RI 9252, B. W. Jong et al) teaches that NaOH can be used in mole ratios of NaOH to W exceeding 3.5. In particular they claim that mole ratios of 7–14 are necessary in order to attain tungsten dissolution efficiencies of 85–90%.

The present invention provides methods for efficiently recovering tungsten from such spent catalysts.

SUMMARY OF THE INVENTION

In accordance with one aspect of the invention, there is provided a method for recovering tungsten from a tungsten containing spent catalyst which comprises digesting the catalyst in aqueous sodium hydroxide solution wherein the mole ratio of the sodium hydroxide to the tungsten contained in the spent catalyst is from about 2.6 to about 4.2 and wherein the amount of water is sufficient to dissolve the subsequently produced sodium tungstate, at a temperature of at least about 90° C. for a length of time of at least about 1 hour to convert greater than about 77% by weight of the tungsten contained in the spent catalyst to sodium tungstate and form a sodium tungstate solution thereof and a residue containing the balance of the starting tungsten, and separating the sodium tungstate solution from the residue.

Essentially all of the tungsten is recovered as sodium tungstate by first grinding the catalyst prior to the digestion and by using a mole ratio of sodium hydroxide to tungsten of about 3.8 to 4.2.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting materials of the present invention are contaminated catalysts from the petroleum refining industry. The catalysts contain typically W, Al, Mo, Si, and P. These components can vary. One type of catalyst which is especially suited to the practice of the present invention is supplied by ICI Katalco, under the name of Katalco 550. According to a bulletin by Katalco, Katalco 550 is a mixture of alumina, nickel oxide and tungsten trioxide.

According to the present invention the catalyst is reacted with sodium hydroxide by the following methods.

The catalyst is digested in sodium hydroxide solution. The mole ratio of sodium hydroxide to tungsten ranges from about 2.6 to about 4.2 (approximately about 1 to slightly more than 2 times the stoichiometric amount needed to form sodium tungstate). Digestion temperatures are generally at least about 90° C. The digestions can be carried out under atmospheric pressure or at higher pressures if necessary to obtain the desired temperature. The digestion time can vary but is longer than about 1 hour and normally about 1 to 4 hours. The time varies with conditions such as temperature, size of the charge, the nature of the equipment, etc. The amount of water is sufficient only to dissolve the sodium tungstate that will be formed as a result of the digestion. At least about 77% by weight of the starting tungsten is recovered as sodium tungstate in solution under these conditions.

One advantage of the present invention is that the dissolution of aluminum in the resulting sodium tungstate solution is kept to a minimum.

The sodium tungstate solution is then separated from the residue which contains the balance of the starting tungsten.

In accordance with another embodiment, the catalyst is first ground to less than about 18 mesh. Normally the catalyst is supplied in larger pieces. For example a typical particle size analysis of the catalyst is about 0.3 to about 1.6% by weight <50 mesh, about 62 to 83% by weight 10 to 50 mesh, and about 17 to 37% by weight >10 mesh. The grinding can be done in any type of mill, such as Quaker City Mill model 4E and then passed through an 18 mesh screen with the oversize material being reground.

When a higher mole ratio of sodium hydroxide to tungsten and a higher temperature is used, for example a mole ratio of about 3.8 to about 4.2 and most preferably about 4.0, and the catalyst is ground as described above prior to digestion, essentially all of the tungsten is converted to sodium tungstate.

In accordance with another embodiment, the catalyst can be roasted if desired, with sodium hydroxide in order to uniformly mix the sodium hydroxide and the catalyst. A wet mixture is first formed of the catalyst, solid sodium hydroxide and water. The mole ratio of the sodium hydroxide to tungsten is about 2.6 to about 4.2, preferably about 3.8 to about 4.2 and most preferably about 4.0. The resulting mixture is fired at a temperature of about 850° C. to about 900° C.

The roasted mixture is then digested in sufficient water according to the general digestion procedure described previously, to dissolve the tungsten as sodium tungstate. It is desirable that the amount of water used is sufficient only to dissolve the tungsten.

The sodium tungstate solution is then separated from the residue which contains the balance of the starting tungsten.

Roasting slightly increases recovery of the tungsten as sodium tungstate.

appropriate amount of time, the resulting slurry is filtered. The resulting sludge is reslurried in water to recover all the sodium tungstate. The amount of tungsten converted to sodium tungstate is calculated. The specific conditions under which the samples of catalyst are roasted or digested are given in Table 1.

TABLE

| Order | | | | Mole Ratio of | | Digestion | | |
|---|---|---|---|---|---|---|---|---|
| Run | Std | Grind | Agent | NaOH/W | Roast | Temp °C. | Time Hrs. | % Tungsten Efficiency |
| 1 | 15 | No | NaOH | 4.0 | Yes | 90 | 4 | 84 |
| 2 | 16 | Yes | NaOH | 4.0 | Yes | 162 | 4 | 97 |
| 3 | 2 | Yes | $Na_2CO_3$ | 2.6 | No | 162 | 1 | 56 |
| 4 | 4 | Yes | NaOH | 2.6 | No | 90 | 4 | 83 |
| 5 | 3 | No | NaOH | 2.6 | No | 162 | 4 | 86 |
| 6 | 1 | No | $Na_2CO_3$ | 2.6 | No | 90 | 1 | 58 |
| 7 | 14 | Yes | $Na_2CO_3$ | 4.0 | Yes | 90 | 1 | 90 |
| 8 | 7 | No | NaOH | 4.0 | No | 90 | 1 | 77 |
| 9 | 8 | Yes | NaOH | 4.0 | No | 162 | 1 | 101 |
| 10 | 12 | Yes | NaOH | 2.6 | Yes | 90 | 1 | 90 |
| 11 | 9 | No | $Na_2CO_3$ | 2.6 | Yes | 90 | 4 | 84 |
| 12 | 5 | No | $Na_2CO_3$ | 4.0 | No | 162 | 4 | 76 |
| 13 | 13 | No | $Na_2CO_3$ | 4.0 | Yes | 162 | 1 | 89 |
| 14 | 10 | Yes | $Na_2CO_3$ | 2.6 | Yes | 162 | 4 | 85 |
| 15 | 11 | No | NaOH | 2.6 | Yes | 162 | 1 | 85 |
| 16 | 6 | Yes | $Na_2CO_3$ | 4.0 | No | 90 | 4 | 63 |
| 17 | 1 | No | $Na_2CO_3$ | 2.6 | No | 90 | 1 | 59 |
| 18 | 6 | Yes | $Na_2CO_3$ | 4.0 | No | 90 | 4 | 71 |
| 19 | 11 | No | NaOH | 2.6 | Yes | 162 | 1 | 95 |
| 20 | 16 | Yes | NaOH | 4.0 | Yes | 162 | 4 | 104 |

In accordance with another embodiment, the catalyst can be ground as described above to less than about 18 mesh size prior to the roasting step.

To more fully illustrate this invention, the following non-limiting example is presented.

EXAMPLE

Samples of tungsten containing catalyst containing in percent by weight about 4–7% nickel oxide, about 18–22% tungsten trioxide and the balance aluminum oxide are digested in either sodium hydroxide or sodium carbonate or roasted with sodium hydroxide or sodium carbonate. (Sodium carbonate is used for purposes of comparison). The conditions are selected by statistical design methods. For those samples requiring it, the catalyst is ground in a Model 4 E Quaker City Mill. It is then passed through an 18 mesh screen with the oversize material being reground. In the samples that are roasted, the roasting is done by adding the appropriate amount of sodium hydroxide or sodium carbonate to about 100 ml of deionized water. After the sodium hydroxide or sodium carbonate has been dissolved, about 100 g of catalyst is mixed in. The resulting mixture is fired at about 870° C. for about 1 hour. The roasting is done in silica boats. After the roasting, the material is mixed with about 400 ml of deionized water. For those samples that are digested only, the appropriate amount of sodium hydroxide or sodium carbonate is dissolved in about 400 ml of deionized water and to this mixture is added about 100 g of the catalyst. The low temperature digestions (90° C.) are carried out in an open vessel. The level of digestion mix is maintained by periodic addition of deionized water. A sealed stainless steel autoclave is used for the high temperature digestions. After the mixture has been digested for the To those knowledgeable in the use of data from statistically designed experimentation it is obvious from Table that the foregone conclusions in sodium hydroxide systems are valid, that is, grinding in combination with the higher ratios of sodium hydroxide and higher digestion temperatures results in increased recovery of tungsten as sodium tungstate. This can be accomplished without roasting. Further analysis of the above data confirmed the above conclusions. The overall efficiencies are higher with sodium hydroxide than with sodium carbonate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for recovering tungsten from a composition consisting essentially of a tungsten containing spent catalyst, said method comprising:

a) digesting said catalyst in aqueous sodium hydroxide solution wherein the mole ratio of said sodium hydroxide to said tungsten contained in said spent catalyst is from about 2.6 to about 4.2 and wherein the amount of water is sufficient to dissolve the subsequently produced sodium tungstate, at atmospheric pressure and a temperature of about 90° C. for a length of time of at least about 1 hour to convert greater than about 77% by weight of said tungsten contained in said spent catalyst to sodium tungstate and form a sodium tungstate solution thereof and a residue containing the balance of the starting tungsten; and b) separating said sodium tungstate solution from said residue.

2. A method of claim 1 wherein said catalyst is ground to less than about 18 mesh prior to said digestion and wherein said mole ratio is about 3.8 to about 4.2.

3. A method of claim 2 wherein said mole ratio is about 4.0.

4. A method of claim 2 wherein essentially all of said tungsten contained in said catalyst is converted to sodium tungstate.

* * * * *